United States Patent [19]

Kim et al.

[11] 3,953,126

[45] Apr. 27, 1976

[54] OPTICAL CONVOLUTION VELOCIMETER

[75] Inventors: Dong Guen Kim, Xenia; Gary Arnold Dubro, Dayton, both of Ohio

[73] Assignee: The United States of America as represented by the Secretary of the Air Force, Washington, D.C.

[22] Filed: Nov. 8, 1974

[21] Appl. No.: 522,368

[52] U.S. Cl............................... 356/28; 250/237 G; 250/573; 250/574
[51] Int. Cl.² ........................................... G01P 3/36
[58] Field of Search....................... 356/27, 28, 103; 250/237 G, 573, 574, 356; 73/194 E

[56] References Cited
UNITED STATES PATENTS

| | | | |
|---|---|---|---|
| 3,519,351 | 7/1970 | Lerwill | 356/28 |
| 3,548,655 | 12/1970 | Rudd | 356/28 |
| 3,675,029 | 7/1972 | Iten et al | 356/28 |
| 3,830,568 | 8/1974 | Allen | 356/28 |
| 3,864,044 | 2/1975 | Lyshkow | 250/573 |
| 3,888,589 | 6/1975 | Swift | 356/28 |

*Primary Examiner*—Maynard R. Wilbur
*Assistant Examiner*—S. C. Buczinski
*Attorney, Agent, or Firm*—Joseph E. Rusz; Robert Kern Duncan

[57] ABSTRACT

The velocity of a fluid flowing through a flow channel, relative to the flow channel, is measured by passing parallel rays of light through the fluid perpendicular to the flow and through an artificially-introduced transfer function device such as a grating or double reflective mirror, and then focusing the light on a photodetector. The basic principle by which embodiments of the invention operate involves the spatial convolution of the light intensity pattern established by the artificially-introduced transfer function with the flowing stream. The transfer function is associated with a known spatial alteration of the light beam. The light intensity pattern resulting from variations in the properties of the flowing stream is characterized by fluctuations which are transported with the flow velocity. These variations of the flowing stream are manifested as localized changes in density, and absorptivity and reflectivity of the light as it traverses the flow channel. This convolution generates a new response function that appears at the electrical output of the photodetector which is periodic and whose base frequency is directly proportional to the flow velocity.

1 Claim, 19 Drawing Figures

Fig 17

OPTICAL CONVOLUTION VELOCIMETER

RIGHTS OF THE GOVERNMENT

The invention described herein may be manufactured and used by or for the Government of the United States for all governmental purposes without the payment of any royalty.

BACKGROUND OF THE INVENTION

The field of the invention is in the art of flow measuring devices.

Fluid flow velocity measuring apparatus is well known. The pitot tube is an example that has been in use for two centuries. More recent velocimetry devices are the hot-wire anemometer, and devices using lasers in both doppler shift and non-doppler modes of operation. Other recent developments in airspeed sensors are disclosed in U.S. Pat. No. 3,680,375 by patentees Joy et al; U.S. Pat. No. 3,519,351 by patentee Lerwill; U.S. Pat. No. 3,833,299 by patentee Lang; and U.S. Pat. No. 3,820,896 to patentee Stavis.

SUMMARY OF THE INVENTION

The invention provides a compact, rugged, stable, economical device that provides both velocity and acceleration characteristics of a flowing medium by detecting and displaying the resulting convolution light intensity response of a parallel light beam traversing the flowing medium and an artificially-introduced transfer function device. The derived convolution response is a voltage whose frequency is linearly related to velocity of the flowing medium. Differentiation of the velocity signal provides the acceleration characteristics of the flowing medium.

BRIEF DESCRIPTION OF THE DRAWING

FIG. 13b is a top edge view of the mirror shown in FIG. 13a;

FIG. 14b is a top edge view of the mirror shown in FIG. 14a;

DESCRIPTION OF THE PREFERRED EMBODIMENT

No fluid flow is ever perfectly homogenous. Small variations in the flow are present that are being transported by the flow at the flow velocity. These small variations, such as localized changes in density, and the characteristics of light absorption and reflectivity, can be detected optically by passing light through the flowing medium and observing the changes in the light intensity. Some prior art velocimeters have structure for creating disturbances, such as vortices, then they count vortices passing a reference point; the number passing in a determined interval of time being indicative of the flow velocity. Some instruments of the "time-of-flight" type utilize doppler shift techniques. The instrument disclosed herein is considered to be in the "time-of-flight" category however it functions by the spatial convolution of the light intensity pattern established by an artificially-introduced transfer function co-acting with the variations in the light intensity due to the nonhomogeneities which are transported by the flow medium. This convolution generates a new intensity response function which is periodic and whose base frequency is directly proportional to the flow velocity.

Figure 1:
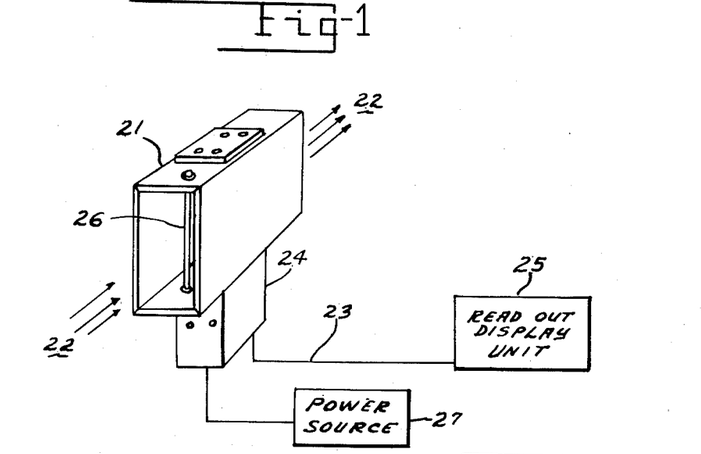
FIG. 1 is a representative pictorial view of an embodiment of the invention.

FIG. 1 is a pictorial view of a typical embodiment of the invention. In this particular operating embodiment, the flow channel 21 through which the flowing medium 22 is contained as it passes was approximately one square inch in cross section. The absolute dimensions of apparatus of this invention are not critical. Those practicing the invention will understand from the following descriptions of embodiments the relative relationships of dimensions with respect to the output characteristics of the devices. In addition they will readily comprehend the light spectral and intensity requirements in connection with the sensitivities of the photo-detection means employed and the light transmissibility and reflection characteristics of the medium from which the flow characteristics are being obtained. The output signal on line 23 from the electrical processor unit 24 is an alternating current signal whose frequency is proportional, and linearly related, to the velocity of the flow 22. This frequency may be read out in a conventional electronic counter display unit 25 in cycles per second or the appropriate time base may be used so that the read-out is directly in feet per second of flow velocity. The counter may be set to up-count for a determined time interval and then down-count for the same time interval and display the difference, which is the change in velocity per unit of time, which is the acceleration of the flowing medium. This usage of electronic counters is conventional and well known. Obviously, the frequency of the signal on line 23 may be displayed by instruments other than an electronic counter. Any of the well known electrical frequency indicating devices may be used. Acceleration characteristics may also be obtained by differentiating a dc analog voltage (such as obtained from a discriminator circuit) of the velocity by a conventional electronic differentiator. The details of such display units are well known and are not a part of this invention. The readout display unit is, however, a component of the combination comprising the invention to provide a complete utilitarian system. This particular embodiment illustrated in FIG. 1 has a heater element 26 which may be used to heat the flowing medium before the medium passes the optical part of the system. With normally very nearly perfectly homogenous flows heating the flow will accentuate the small nonhomogeneities present and decrease the sensitivity required of the optical system. It is to be observed that the system does not utilize turbulence, vortices, or any temperature gradients created by the heater. In the majority of flows, heating will not be required with optical and electronic systems of normal sensitivity. The heating of the flow is not critical, but may be desirable. Both ac and dc currents have been used successfully. In the particular embodiment being illustrated and described a conventional nichrome wire heating element dissipating approximately 2 watts of electrical power at five volts 60 Hz has proven very satisfactory. The conventional power source 27 supplies the energy requirements of the electronic processing unit 24 and the heater element 26.

A requirement of the optical system of the invention is that it includes an element to provide an artificially-introduced transfer function which intercepts the collimated light traversing the flowing medium. Generally the preferred embodiments of the invention comprise a double-faced mirror providing this transfer function, and two photodetectors whose outputs are subtracted to provide a differential light detector system. The optical system of an embodiment having this structure is illustrated schematically in FIG. 2. A cross-section side view of the mechanical structure is shown in FIG. 3 and an end view of the structure represented by FIG. 3 is shown in FIG. 4. Embodiments having a double-faced mirror are the most compact physically, and embodiments having two photodetectors differentially connected are much less susceptible to extraneous noise components (from stray light, for example), thus embodiments having these combinations of elements are generally preferred.

Figure 2:
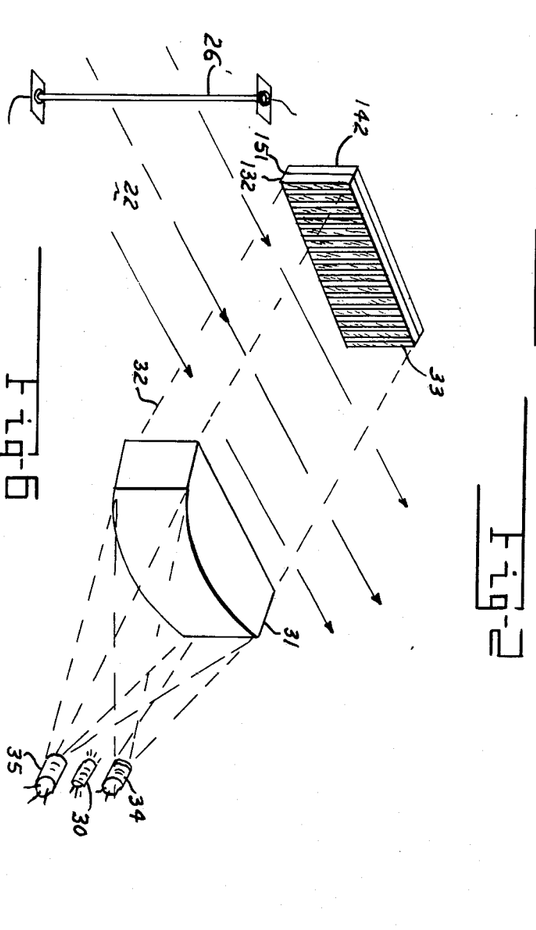
FIG. 2 is a schematic-pictorial view of a typical optical system employing differential sensing of the reflected light beam.
Figure 3:
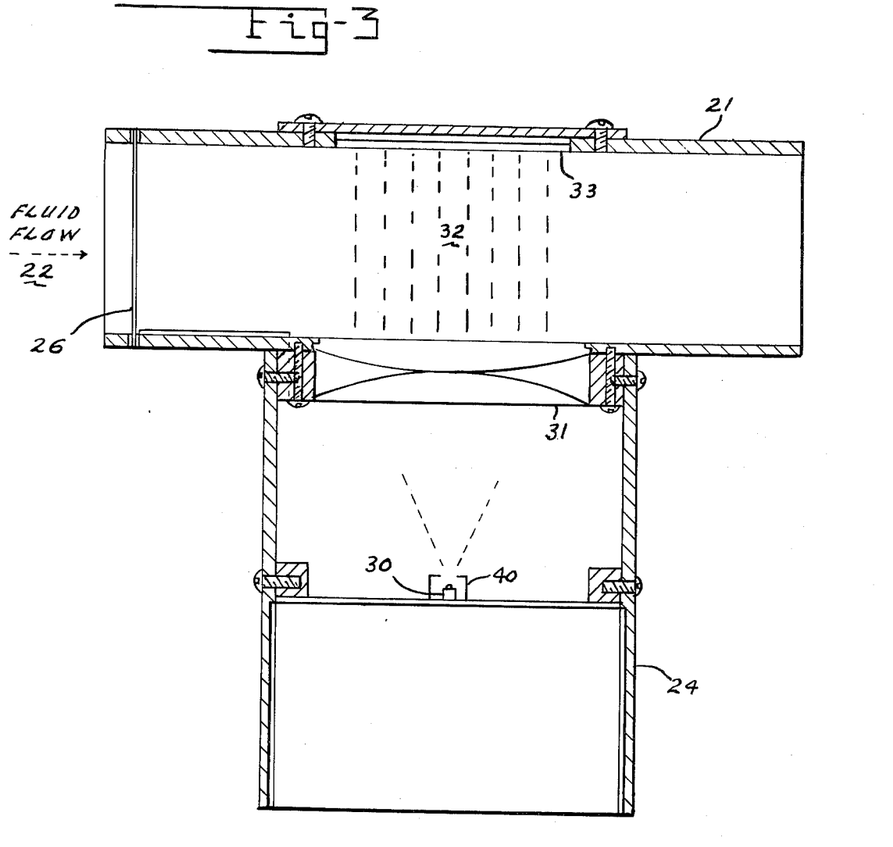
FIG. 3 is a section view of the mechanical structure of a typical embodiment having a double-faced mirror transfer function generating element.
Figure 4:
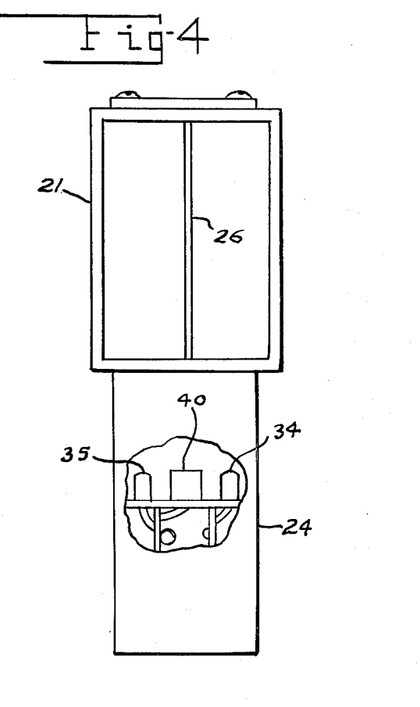
FIG. 4 is a side view of the structure shown in FIG. 3.

Referring to FIGS. 1 through 4, the fluid flow 22, which in a typical instance is the air through which an aircraft is passing, passes first over the heater element 26 which can be energized if necessary, such as might be desirable at high altitudes. Generally it is preferable to have the heater element 26 positioned with respect to the rest of the apparatus as shown in FIGS. 1, 3 and 4. It may be placed at right angles to this position as the heater element 26 is shown in FIG. 2. Configuration of the heating element is not critical. A light source 30 (such as a type MLED 910 is suitable), provides the necessary illumination. The light must be collimated by a lens system 31 so that parallel rays of light 32 traverse the fluid flow 22 substantially at right angles to the direction of flow. In these generally preferred embodiments the lens system 31 simultaneously serves two functions, it collimates the light from the light source 30 into parallel rays, and then it refocuses the light returning from the double-faced mirror 33 onto the two photodetectors 34 and 35. Suitable photodetectors for use with the previously enumerated light source are type LS 400 phototransistors. (Type FPT 102 photodiodes with appropriate preamplifiers may be used.)

Figure 13A:
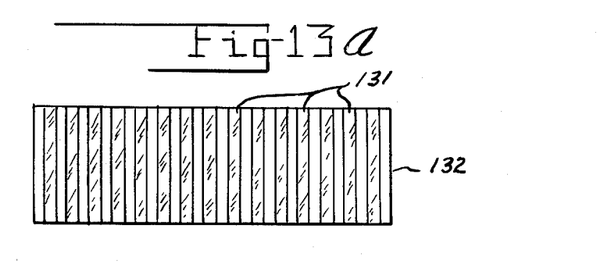
FIG. 13a is a pictorial representation of a front mirror element of a doubly-reflective mirror system.
Figure 13B:
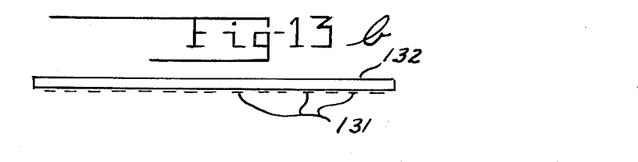
Figure 14A:
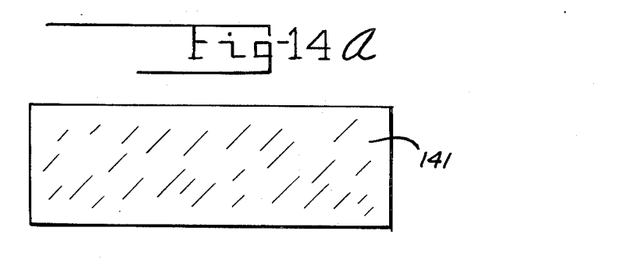
FIG. 14a is a pictorial representation of a rear mirror element of a doubly-reflective mirror system.
Figure 14B:
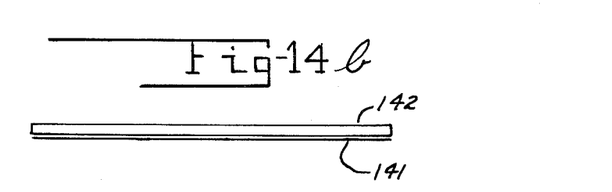
Figure 15:
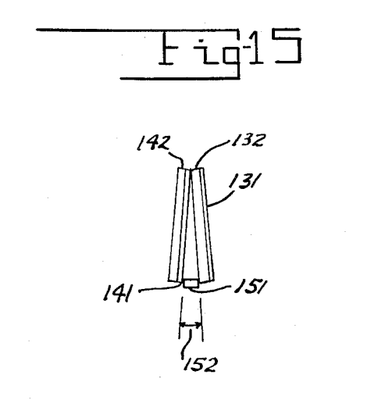
FIG. 15 is a representative view of a double-faced mirror system showing the angle of separation enlarged for illustration.

A typical double-faced mirror may easily be constructed as shown in FIGS. 13a, 13b, 14a, 14b, and 15. Two interdigitated strips of substantially totally reflecting surfaces, with the parallel reflective strips of one surface slightly angled to the parallel reflective strips of the other surface are required. In a typical embodiment the reflective elements are fabricated by conventionally depositing gold on conventional microscope slide glasses. With the previously enumerated light source and photodetectors, gold is the preferred reflecting material due to its spectral characteristics. With other light sources and photodetectors, other surface materials such as silver may be more appropriate to match the spectral characteristics of the particular light used. FIG. 13a is a front view of the front mirror having a set of parallel, planar, reflective gold strips 131 deposited on a glass microscope side. The equal parallel strips are equally spaced apart a distance equal to their width. FIG. 13b is a top or edge view of the glass microscope slide 132 showing the front deposited reflective strips 131. The second set of parallel, planar, strips may be easily, effectively, formed by depositing a gold reflective surface 141 completely over the surface of a second mircoscope glass side 142 and positioning it behind the first slide as shown in FIG. 15. FIG. 14b is a top edge view of the coated slide as shown in the front view on FIG. 14a. Any substantially flat transparent medium (transparent to the light from the source 51) may be used in place of the front glass slide. Obviously, the rear mirror surface need not be placed on a transparent medium. A thin wedge 151 is placed along one edge between the glass slides to provide an angle of separation 152. A wedge sufficient to provide approximately 0.4° of angle has been found to be suitable for the particular embodiments being described in detail. The absolute value of the angle is not critical, only that the correct alignment with the other elements is required. The angle formed between the two reflective surfaces cooperates with the spacing between the photodetectors 34 and 35, and the lens 31, such that the light reflected from one surface of strips is brought to focus on one photodetector, by the lens system 31 and the light reflected from the other surface of strips is brought to focus by the lens 31 on the other photodetector. A thin, narrow, strip of gold foil provides a suitable wedge. Conventional adhesive bonding of the foil to the microscope slides at the location shown in FIG. 15 has been found satisfactory for maintaining the proper alignment. The foregoing description of a doubly-reflective mirror provides a simple, economical, satisfactory element. It is not required that it be fabricated in this exact form. The requirements of the doubly-reflective mirror are that a first set of a plurality of equally spaced planar reflective elements be interleaved with a second set of a plurality of equally spaced planar reflective elements such that the parallel perpendicular reflections from the first reflective elements make an angle with the parallel perpendicular reflections from the second, such that the reflections may be separately detected. In the operation of the doubly-reflective mirror in this invention, it is to be understood that the doubly-reflective mirror is positioned such that the collimated light rays impinging on the mirror are reflected back, with the angle of incidence equal to the angle of reflection and the angles of reflection are such that the light is brought to focus from one mirror set on one photodetector and the light from the other mirror set is focused on the other photodetector. (The light rays neither strike or leave the mirror surfaces perpendicularly to the reflective surfaces.) Generally, it is desirable to shield the photodetectors 34 and 35 from stray light rays from the light source 30 by positioning a light shield 40 around the light source as shown in FIGS. 3 and 4.

Figure 17:
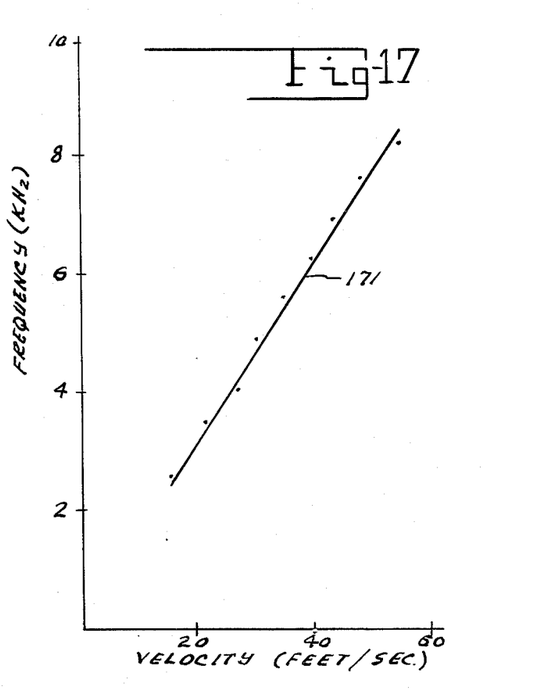
FIG. 17 is a typical calibration plot of the output frequency from the electronic processor unit of a typical embodiment of the invention showing the linearity of the apparatus with respect to fluid velocity.

The frequency in Hz of the output signal on line 23 may be expressed by the relationship $f \approx v/d$, where $v$ is the velocity of the flowing medium and d is spacing of the effective sampling period. In the typical embodiment being described the widths of the reflective strips were approximately 0.04 inch, which provides approximately 25 pulses per inch of flow travel. This provides a device having a typical calibration characteristic as shown in FIG. 17. Thus in this typical embodiment the period d in feet per cycle is approximately 0.08/12, and the velocity of the flowing medium may be expressed as $v = Hz(0.0066)$. For example, a 3 kHz signal is indicative of approximately a 20-feet per second flow velocity.

Figure 5:
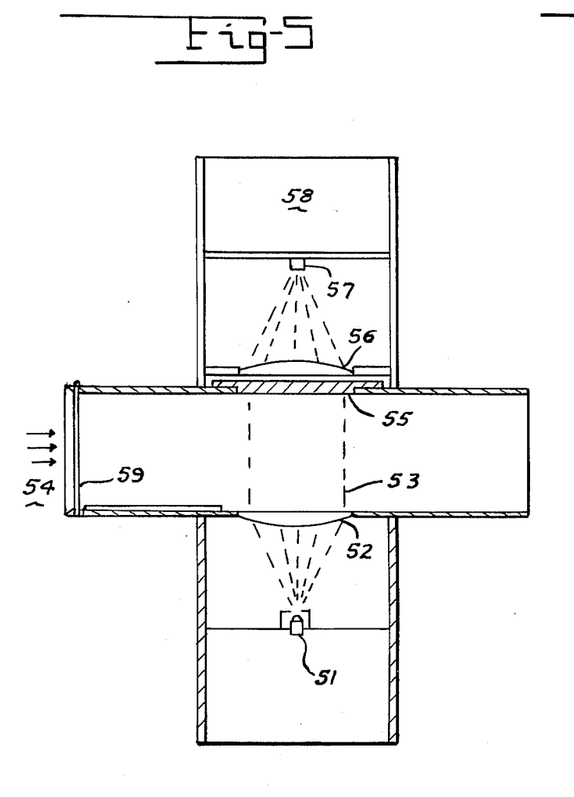
FIG. 5 is a representative pictorial view of the optical structure of a typical embodiment having a transparent transfer function generating element.

FIG. 5 shows schematically in cross section typical mechanical structure for embodiments of the invention using a single photodetector. In these embodiments the light flow is from the light source 51 through the collimating lens 52, which forms the light into parallel rays 53 traversing the flowing medium 54, and then through the artificially-introduced transfer function element 55, then the light rays are focused by the lens 56 on the single photodetector 57. The electronic processor unit for these embodiments is generally contained in the compartment 58. The fundamental relationships previously stated for the earlier described embodiments generally apply except for the structure of the transfer function element 55, and separate individual lens systems are used for the collimating lens and the focusing lens. The physical structures involved in the lens systems are not critical provided the functions of collimating and focusing are obtained. It is generally desirable to include a heater element 59 in these embodiments for the same reason as previously explained. These embodiments do not have a differential photodetecting system hence they are more susceptible to extraneous noise signals.

Figure 6:
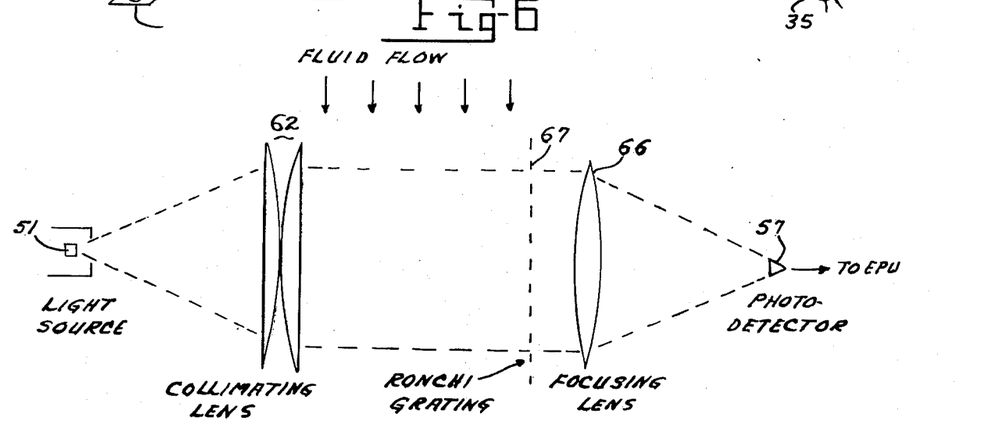
FIG. 6 is a schematic representation of an optical system of an embodiment of the invention having a Ronchi grating transfer function generating element.

A schematic diagram of a typical optical system for embodiments represented by FIG. 5 is shown in FIG. 6. The collimating lens system 62 and the focusing lens system 66 are represented schematically as previously by simple lens elements. In this embodiment the artificially-introduced optical transfer function element 67 is a conventional Ronchi grating. For embodiments using this structure and having the range of response characteristics that the earlier described embodiments have, the Ronchi grating has equal opaque and transparent elements of approximately 0.04 inch widths. (Different widths would result in a different calibration.)

Figure 7:
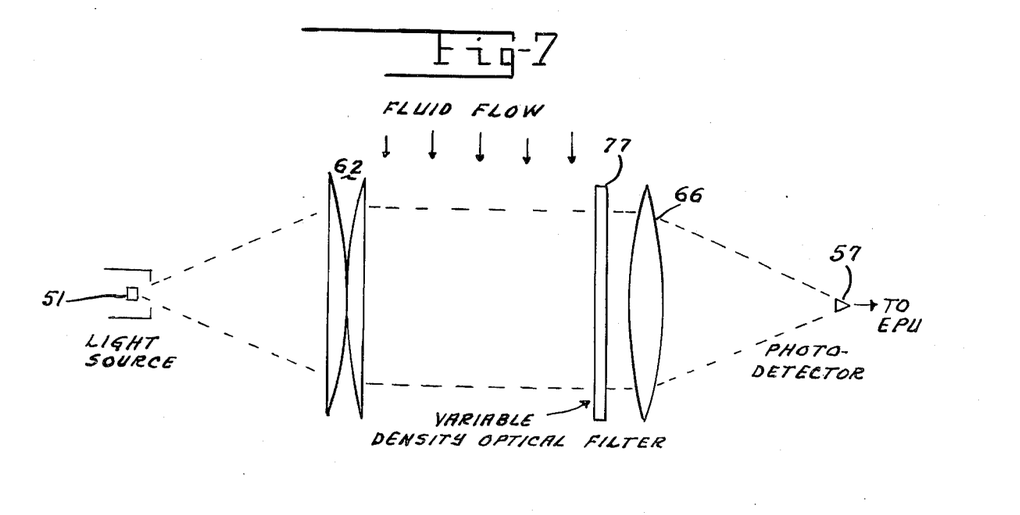
FIG. 7 is a schematic representation of an optical system of an embodiment of the invention having a variable density optical filter transfer function generating element.

Instead of using a Ronchi grating to provide the artificially-introduced transfer function an optical element with a determined variation in optical density may be used. FIG. 7 shows schematically such an optical system. It is similar to the Ronchi grating system shown in FIG. 6 except the Ronchi grating 67 is replaced with the optical element 77 as shown in FIG. 7. The requirement on this optical element is that it has a determined pattern in its light transmissibility characteristics that will provide a known light intensity response characteristic. This known light intensity response then is convoluted with the intensity response of the non-homogeneities in the flowing medium to provide a resultant response from which the electronic processor unit derives a signal whose base frequency is proportional to the flow velocity. Typical examples of this optical element are variable density optical filters in which the variable density is in the form of a step function, a cosine function, and a pulse train function. The optical density cannot be a constant as a function of distance in the element along the direction of flow, but must have a known variation in density as a function of $x$, the distance along the element in the direction of flow.

Figure 8:
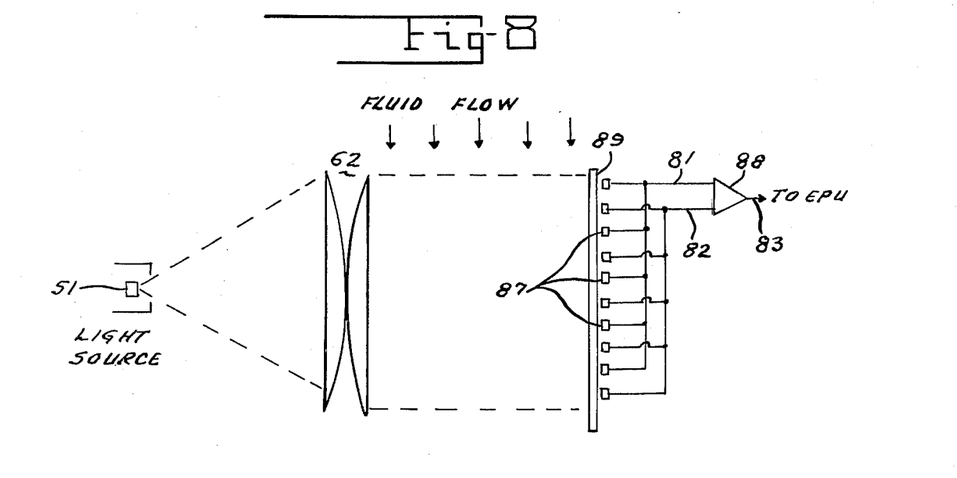
FIG. 8 is a schematic representation of an optical system of an embodiment of the invention having a photodetector array providing the transfer function.

The artificially-introduced transfer function may also be generated by an array of photodetectors 87, as shown schematically in FIG. 8, having alternate detectors connected in parallel such that two signals, one signal on line 81 and one signal on line 82, are provided to the differential amplifier 88. The differential amplifier provides an output signal on line 83 to the electronic processor unit which is proportional to the instantaneous differences between the two signals. The signal on line 83 is the effective convolution response of the changes in light intensity due to the non-homogeneities in the medium and the step function introduced by the detector array and differential amplifier system. Element 89 merely represents a thin transparent wall section in the flow channel.

Figure 9:
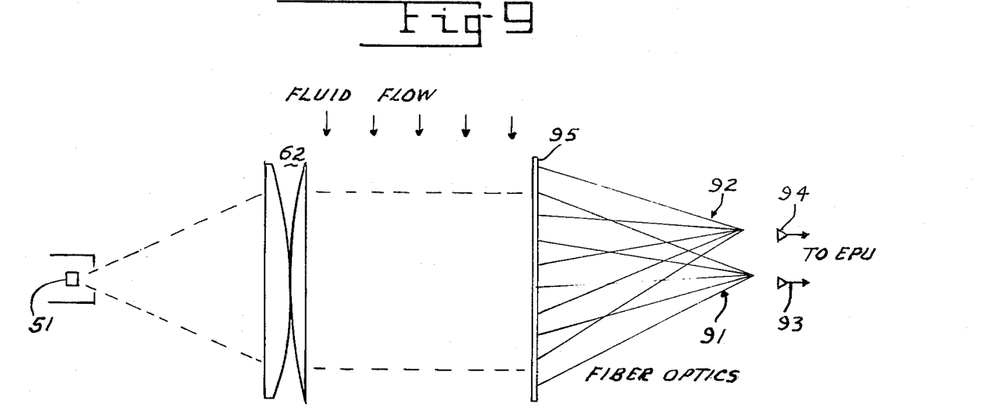
FIG. 9 is a schematic representation of an optical system of an embodiment of the invention having a fiber optic array cooperating with differentially connected photodetectors providing the transfer function.

A similar functioning embodiment may be provided as shown in FIG. 9. In these embodiments as represented by this figure fiber optic members 91 are interleaved, along the flow direction, with fiber optic members 92. Each set of fiber optics conduct light to a respective photodetector, i.e., set 91 to photodetector 93, and set 92 to photodetector 94. The other ends of the fiber optic member are extended through the flow channel wall 95 and are flush with the inner wall surface to provide a smooth channel surface for the flowing medium. Alternatively, wall member 95 may be a transparent member and the ends of the fiber optic members may be positioned adjacent the transparent wall.

Figure 10:
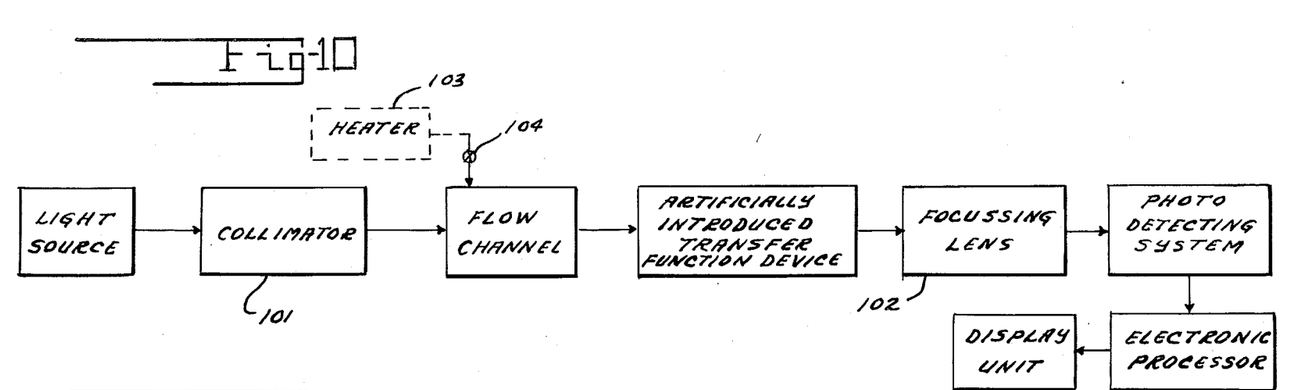
FIG. 10 is a representative block diagram of an embodiment of the invention.

FIG. 10 shows a representative block diagram illustrating in block form the major components of the invention. As previously indicated the collimator 101 and the focusing lens system 102 may be one structure providing both functions. The heater 103, while generally not required for normal operation of the embodiments, is generally desirable for improved operation with some flows. Heat may either or not be applied to the medium by activation of switch 104. The display unit 105 as previously discussed may read either or both velocity and acceleration.

Figure 11:
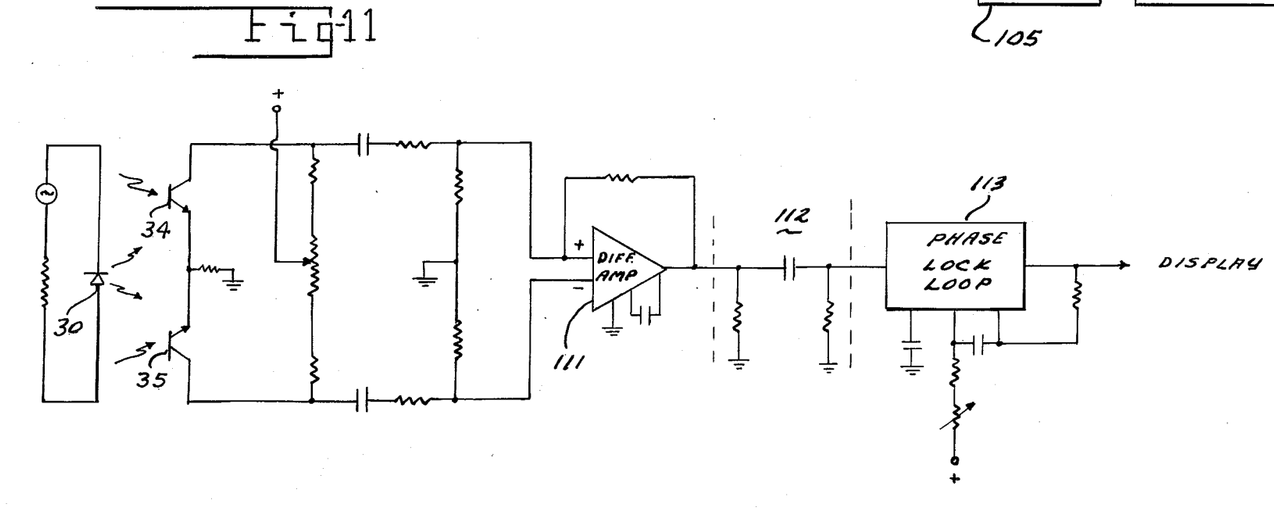
FIG. 11 is a schematic diagram of a typical differential photodetector system and electronic processor unit.

FIG. 11 is an electronic schematic diagram of a typical electronic processor unit, (the light source and photodetectors are also shown for clarity), that may be used with embodiments of the invention that operate in a differential detection mode. It is applicable to the embodiments illustrated in FIGS. 1, 2, 3 and 4. It is also suitable for the embodiment illustrated in FIG. 9 with the photodetectors 34 and 35 replaced by those represented at 93 and 94 in FIG. 9. The operation of the system may readily be understood from the schematic diagram. Briefly, the phototransistors 34 and 35 are differentially connected to the conventional difference amplifier 111. The difference signal from this amplifier is passed through the conventional high pass RC filter 112 to remove low frequency variations and noise from the signal. The conventional phase-lock-loop circuit 113 is used to present a clean uniform alternating current signal to the display unit. The use of a phase-lock-loop circuit is not mandatory but highly desirable. Such circuits are well known and in wide usage. A type LM 208 module for amplifier 111, and a type LM 565 module for the phase locked loop circuit 113 are typical and have proven generally suitable.

Figure 12:
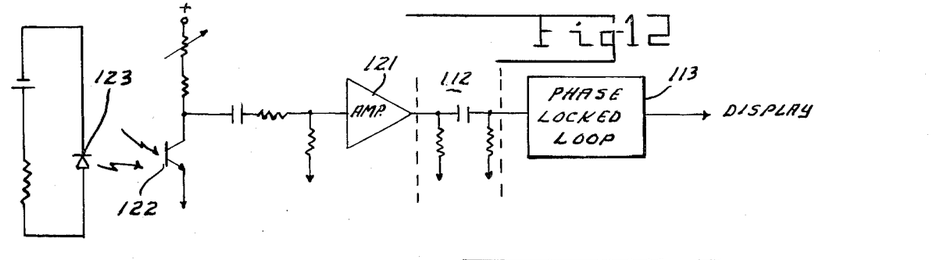
FIG. 12 is a schematic diagram of a typical single photodetector system and electronic processor system.

FIG. 12 is an electronic schematic diagram of a typical electronic processor unit (included also is the light source and photodetector) suitable for the embodiments illustrated in FIGS. 5, 6 and 7. By taking the signal on line 83 of the embodiment illustrated in FIG. 8 and feeding it into the amplifier 121 instead of the circuits shown it may also be used with the embodiments illustrated by FIG. 8. As in the previous electronic schematic diagram, a type LS 400 phototransistor or a type FPT 102 photodiode with a conventional preamplifier may be used for the photodetector 122. The amplifier 121 is a conventional amplifier. It may also be a type LM 208 as in the previous schematic diagram with the unused input grounded. The light source 123 is typically a type MLED 910 light emitting diode. The filter circuit 112 and the phase locked loop circuit 113 are the same and provide the same function as in the previous schematic diagram.

In embodiments of this invention the excitation current for the light source is not critical. Generally, either ac or dc may be used. With embodiments having a differential mode of operation such as represented by the schematic diagram of FIG. 11. The frequency of the excitation for the light source is automatically removed from the output by the differential action of the electronic circuit. For the embodiments of the invention having a photodetector input as represented by the schematic diagram of FIG. 12 it is preferable when an alternating current excitation voltage is used for the light source that the frequency of the excitation voltage be outside the normal operating range of output frequencies of the devices. Thus for some low velocity embodiments it will be desirable to use a direct current source of excitation voltage for the light source of these embodiments.

Figure 16:
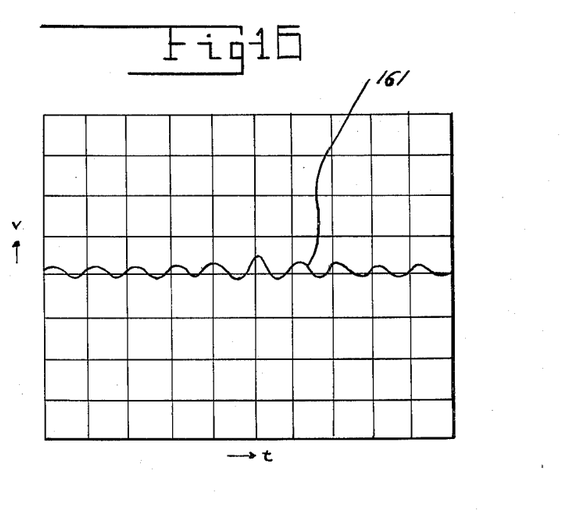
FIG. 16 is a typical plot taken from an oscilloscope trace of the signal voltage from the electronic processor unit.

FIG. 16 is a copy of an oscilloscope trace 161 of the signal on the output line from the electronic processor unit of a typical operating embodiment of the invention when the velocity of a flowing medium was being measured. FIG. 17 shows the calibration response 171 of this same typical operating embodiment.

We claim:
1. A fluid flow velocimeter comprising:
   a. a flow channel having a first and a second wall for containing the said fluid flow and providing a direction of flow parallel to the said first and second wall;
   b. a double-faced light reflective element positioned in the said first wall;
   c. a light source;
   d. a first and a second photodetector;
   e. a lens positioned in the said second wall collimating the light from the said light source and passing the collimating light through the said fluid flow to the said double-faced light reflective element and for focusing the reflected light from one face of the double-faced light reflective element onto the said first photodetector and the reflected light from the other face of the reflective element on the said second photodetector;
   f. means including a differential amplifier cooperating with the said first and second photodetectors for providing an output signal responsive to the difference in light intensity detected by the said first and second photodetectors; and
   g. means for displaying the frequency of the said output signal.

* * * * *